United States Patent [19]

Eitel

[11] 4,029,400
[45] June 14, 1977

[54] PRESSURE BALANCED COOLED MIRROR WITH AXIALLY MOVABLE TRANSFER TUBE ASSEMBLIES

[75] Inventor: Fredrick G. Eitel, North Palm Beach, Fla.

[73] Assignee: United Technologies Corporation, Hartford, Conn.

[22] Filed: Nov. 25, 1975

[21] Appl. No.: 635,182

[52] U.S. Cl. ............................. 350/310; 350/288
[51] Int. Cl.² ......................................... G02B 5/08
[58] Field of Search ............ 350/310, 288; 126/271

[56] References Cited

UNITED STATES PATENTS

| 1,530,441 | 3/1925 | Thomson | 350/310 |
| 3,854,800 | 12/1974 | Dye et al. | 350/310 |

Primary Examiner—John K. Corbin
Assistant Examiner—Jon W. Henry
Attorney, Agent, or Firm—Jack N. McCarthy

[57] ABSTRACT

A cooled laser mirror assembly includes a cooled laser mirror and mounting structure for isolating hydraulic pressure loads from the mirrors and the mounting structure. The assembly allows both elevational and lateral adjustment of the mirror. Transfer tube assemblies direct a coolant through the mounting structure for cooling the mirror, and the assemblies permit adjustment of the mirror without placing unwanted forces thereon. The mirror is pivotally mounted on trunnions with the trunnion on one side permitting fore and aft movement of the mirror. Means are provided to fixedly position the mirror after an elevational or lateral adjustment has been made.

8 Claims, 5 Drawing Figures

PRESSURE BALANCED COOLED MIRROR WITH AXIALLY MOVABLE TRANSFER TUBE ASSEMBLIES

The invention herein described was made in the course of or under a contract with the Department of the Navy.

BACKGROUND OF THE INVENTION

Two patents showing prior art ways of directing coolant fluid into and from a laser mirror are shown in U.S. Pat. No. 3,637,296 and U.S. Pat. No. 3,854,799. Two U.S. Patent applications which show related laser mirrors are U.S. Ser. No. 576,493 filed May 12, 1975 now Pat. No. 4,006,973 and U.S. Ser. No. 576,492 filed on the same date now Pat. No. 4,006,972. These applications have a common assignee with subject application.

SUMMARY OF THE INVENTION

It is an object of the invention to isolate hydraulic pressure loads from a cooled mirror so that mirror alignment will not be affected and the mirror surface will not be deflected.

It is another object of the invention to balance the hydraulic forces caused by the coolant so that the mirror and supporting structure will not have any significant loads placed thereon to interfere with mirror operation.

Another object of this invention is to provide a floating coolant transfer tube means having a transfer tube and end pistons spaced from the ends thereof which are attached by a tie rod extending through the transfer tube and which form radial outlet and inlet means along the floating tube means.

A further object of the invention is to provide a mirror assembly which will permit both elevational and lateral adjustment of the mirror without affecting the operation of the coolant transfer tube or placing forces on the mirror from the tube.

Another object of this invention is to provide a system for isolating hydraulic loads on mirrors having the coolant flow entering one side of a mirror and exiting on the other side.

DESCRIPTION OF THE PREFERRED EMBODIMENT

Figure 1:
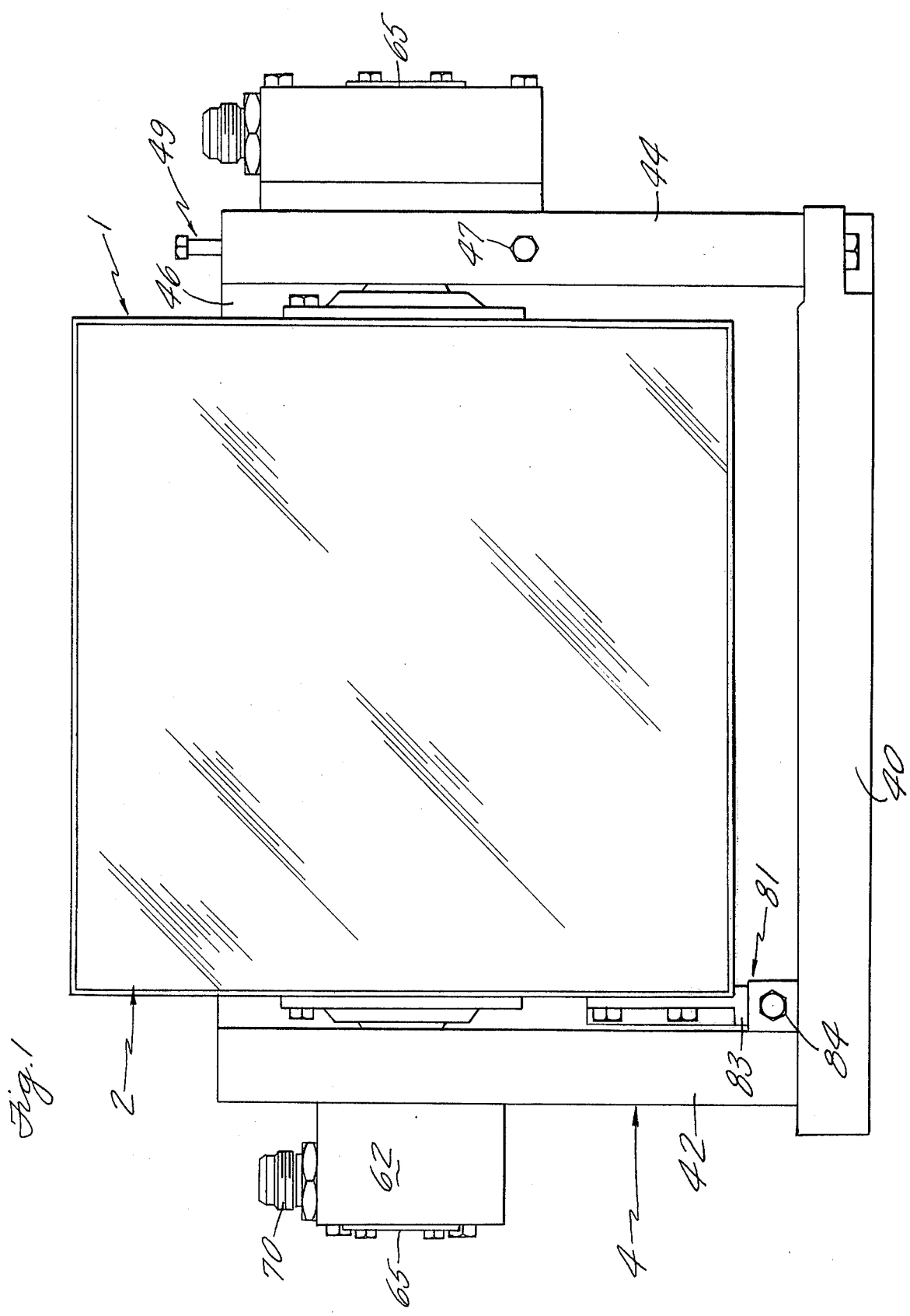
FIG. 1 is a front view of a laser mirror assembly.
Figure 2:
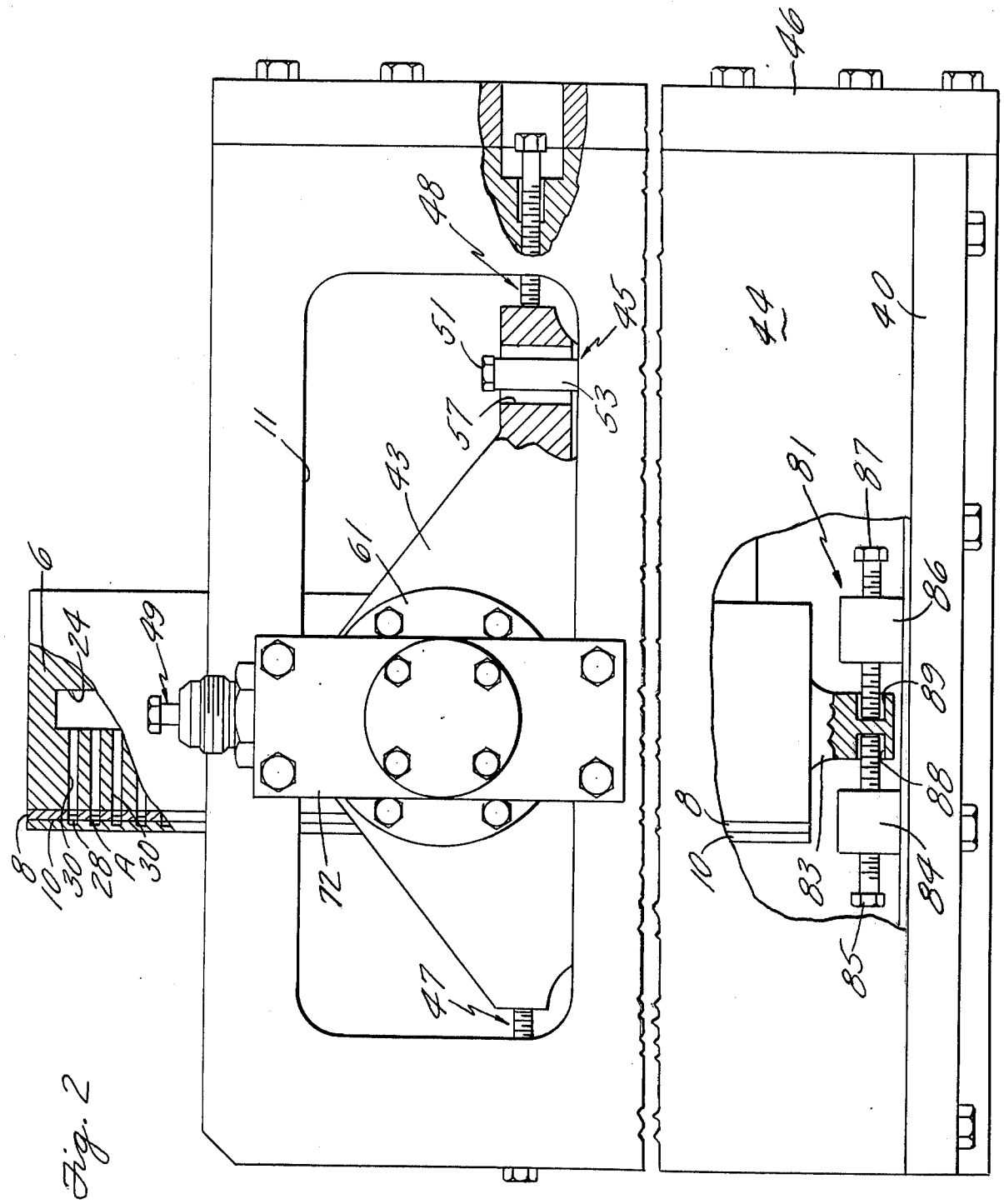
FIG. 2 is an enlarged right elevational view of the laser mirror assembly of FIG. 1 with portions broken away.

The laser mirror assembly 1 includes a cooled laser mirror 2 and a mounting means 4. The laser mirror 2 comprises a backing member 6 with two cover plates 8 and 10 mounted thereon. A similar reflecting device is shown in U.S. Pat. No. 3,637,296. Two cylindrical openings 12 and 13 are located extending inwardly from approximately the center of the side of the backing plate 6 at two opposed locations through which coolant flow is directed towards and away from the laser mirror 2 by transfer tube assemblies 14 and 15, respectively. The backing member 6 has a manifold 20 on one side thereof extending from a point adjacent the top thereof to a point adjacent the bottom. This manifold 20 intersects the opening 12 at the mid-section thereof where an enlarged cavity 22 is located. The backing member 6 also has a similar manifold 24 on the other side. This manifold 24 intersects the opening 13 where an enlarged cavity 26 is located.

Cover plates 8 and 10 have mating grooves 28 therein which form a plurality of channels A extending the width of the mirror 2. A passage 30 extends between inlet manifold 20 and each adjacent end of the channels A while a similar passage 30 connects each other end of the channels A to the outlet manifold 24. This carries a coolant from the inlet manifold 20 to the outlet manifold 24. A trunnion 32 is attached to one side of the backing plate 6 and has an opening 34 therein which is aligned with the cylindrical opening 12.

A similar trunnion 33 is attached to the other side of the backing plate 6 and has an opening 35 therein which is aligned with the cylindrical opening 13. The mirror 2 is pivotally mounted in the mounting means 4 by the use of these trunnions. The trunnions 32 and 33 are fixed to the backing plate 6 by bolts and include an aligning pin connection to properly locate a trunnion with respect to the backing plate.

The mounting means 4 comprises a housing consisting of a bottom plate 40, two upstanding side plates 42 and 44 fixed thereto, and a backing plate 46. These plates are bolted together and form a rigid housing and mount. The right upstanding side plate 42 has an opening 9 therethrough for supporting a trunnion shaft 50 of trunnion 32. The trunnion shaft 50 includes an inwardly tapering conical surface 52 which tapers down to a threaded end. A spherical trunnion bearing 54 is held on the shaft 50 by means of a spanner nut 55 on the threaded end. The inner side of the spherical trunnion bearing 54 has a conical inner surface which mates with the conical surface 52. Two conical races 56 and 58 are positioned around the spherical surface of the spherical trunnion bearing. The races 56 and 58 have inwardly facing conical surfaces which engage the spherical surface of the spherical trunnion bearing. The race 58 is press fitted into an inner portion of the opening 9 in the side plate 42 while the conical race 56 has a loose fit in an enlarged portion of the opening 9 and is spring biased inwardly by a wave spring 60 which is biased against an annular surface on a coolant inlet housing adapter 62.

The housing adapter 62 is fixed to the side plate 42 and has an opening therethrough which includes a cylindrical opening 64. An enlarged recessed opening 66 is located at the end of the opening 64 on the inner surface of the adapter 62, into which the free end of the shaft 50 extends. The cylindrical opening 64 has a small inwardly projecting flange for a purpose which will be hereafter described. An inlet opening 68 intersects the cylindrical opening 64 at the mid-section thereof. An inlet fitting 70 is fixed in the opening 68.

The transfer tube assembly 14 is positioned in the elongated opening formed by cylindrical opening 64, recess 66, opening 34, and cylindrical opening 12 including cavity 22. The transfer tube assembly 14 comprises a tubular member 36 extending between the adjacent end portions of cylindrical opening 12 and cylindrical opening 64. The ends of the tubular member 36 each an equally sized piston member 38 thereon with an O-ring around the periphery thereof. The O-rings of the piston member engage the respective inner part of the opening 64 and outer part of the opening 12. Two cap, or piston, members 37 and 39, equally sized as piston member 38, have an O-ring around the periphery thereof with the cap member 37 having its O-ring engaging the outer part of opening 64 and the cap member 39 having its O-ring engaging the outer part of opening 12. This construction provides an annular inlet between one end 38 of the tubular member 36 and the piston member 37, and an annular outlet between the end 38 of the tubular member 36 and the piston member 39. The adjacent centers of the piston members 37 and 39 are interconnected by a tie rod 41 to fix them together and properly space them. The outer ends of the piston members 37 and 39 are located a fixed distance apart which is less than the distance between the inner end of opening 12 and the outer end of opening 64. A plate 65 is placed over the outer end of opening 64 with a vent hole therein. The inner end of opening 12 also has a vent therein to the rear of the backing plate 6. This construction allows a small relative movement between the interconnected piston members 37 and 39 and the mirror 2 and housing. Each piston member 37 and 39 has tangs 31 located thereon which extend towards the tubular member 36 to maintain it in place. The tangs 31 allow a small relative movement between the tubular member 36 and interconnected piston members 37 and 39. It can be seen that this will allow the transfer tube to have more flexibility.

The left upstanding side plate 44 has a large elongated opening 11 extending from the front to the rear thereof for supporting a trunnion support block 43. The trunnion support block 43 has an opening 9 therethrough for supporting a trunnion shaft 50 of trunnion 33. The trunnion shaft 50 of trunnion 33 is mounted in the trunnion support block 43 in the same manner as the trunnion shaft 50 of trunnion 32 is mounted in the opening 9 of side 42, with the exception that the wave spring 60 is biased against an annular surface on a circular flange 61 which is bolted to the outer surface of trunnion support block 43.

The trunnion support block 43 is mounted in the opening 11 so that it can be moved in a forward or rearward direction to provide a small degree of lateral adjustment providing for lateral adjustment of the mirror 2. The trunnion support block is made shorter than the length of opening 11 with a screw thread adjustment means 47 at the forward end thereof and a screw thread adjustment means 48 at the rearward end thereof. The adjustable screws are threadably mounted in the side plate 44. Top screw locking means 49 is provided between the side plate 44 and support block 43 which is unlocked for movement of the support block 43 and locked when the desired position of the support block 43 is obtained by the adjustment means 47 and 48. A guide means 45 is positioned at the rearward end of the trunnion support block 43 to aid in keeping the support block 43 aligned in the opening 11 and to limit the longitudinal movement thereof. This guide means comprises a bolt 51 and guide sleeve 53 which extend upwardly from the bottom of opening 11 through an elongated opening 57 in the support block 43.

A coolant outlet housing adapter 72 is fixed to the side plate 44 on top and bottom spacers 74 and 76, respectively. The top spacer is positioned between the top of the housing adapter 72 and the side wall 44 adjacent the top of opening 11 and the spacer 76 is located between the bottom of the housing adapter 72 and the side wall 44 adjacent the bottom of the opening 11. This spacing provides the same effect as the recess opening 66 in the housing adapter 62. The housing adapter 72 has a cylindrical opening 75 which is similar to cylindrical opening 64 in housing adapter 62. The cylindrical opening 75 has a small inwardly projecting flange for a purpose which will be hereafter described. An outlet opening 78 intersects the cylindrical opening 75 at the mid-section thereof. An outlet fitting 79 is fixed in the opening 78.

The transfer tube assembly 15 is positioned in the elongated opening formed by cylindrical opening 75, the space formed by spacers 74 and 76, opening 35, and cylindrical opening 13 including cavity 26. The transfer tube assemblies 15 is similar to the transfer tube assembly 14 and performs the same function. A plate 65 is placed over the outer end of opening 75 with a vent hole therein. The inner end of opening 13 also has a vent therein to the rear of the backing plate 6. This transfer tube assembly has the same flexibility as transfer tube assembly 14.

It is noted that the transfer tube assemblies 14 and 15 provide all the flexibility needed to permit the pivotal movement allowed by the trunnions 32 and 33 which provides for elevational adjustment of the mirror 2 and the sliding movement permitted by the movement of trunnion support block 43, which provides for lateral adjustment of the mirror 2 without interfering with the pressure balancing function of the transfer tube assembly. The pivotal movement of the mirror 2 is limited by an adjustment and locking means 81 which includes a depending arm 83 fixed to the right side of backing plate 6. The arm 83 extends downwardly between two blocks 84 and 86 which are fixed to the bottom plate 40 and against the side plate 42. Adjustment screws 85 and 87 extend through the blocks 84 and 86, respectively and are located in axial alignment with the arm 83. Screw engaging recesses 88 and 89 are located on each side of the arm 34 to receive the free ends of the screws 85 and 87, respectively. When the mirror 2 is moved into its desired position, the screws 85 and 87 are threaded inwardly until they reach the ends of the recesses where they lock the mirror in place.

Figure 3:
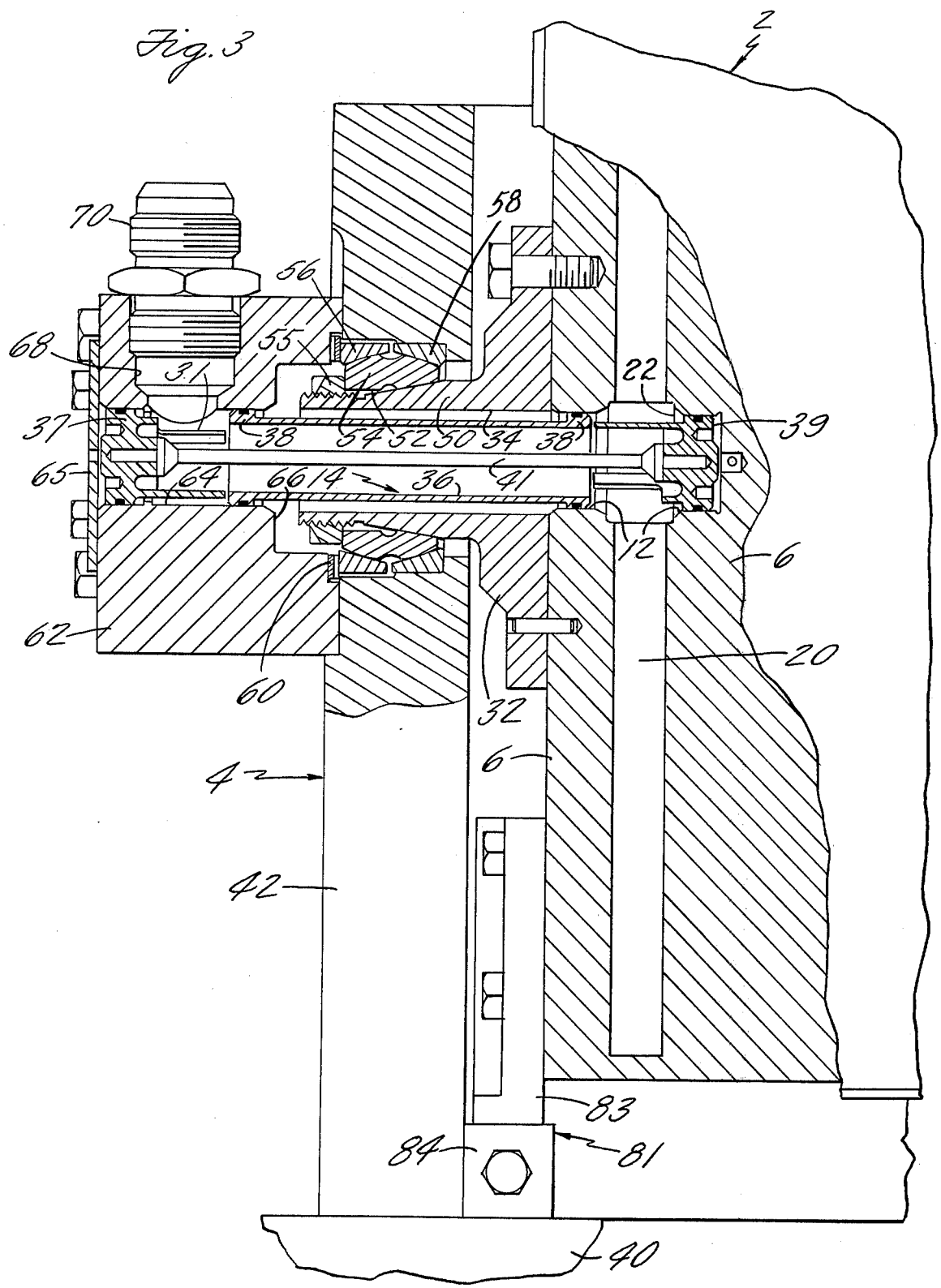
FIG. 3 is an enlarged fragmentary view showing a section through the right trunnion and mounting means.
Figure 4:
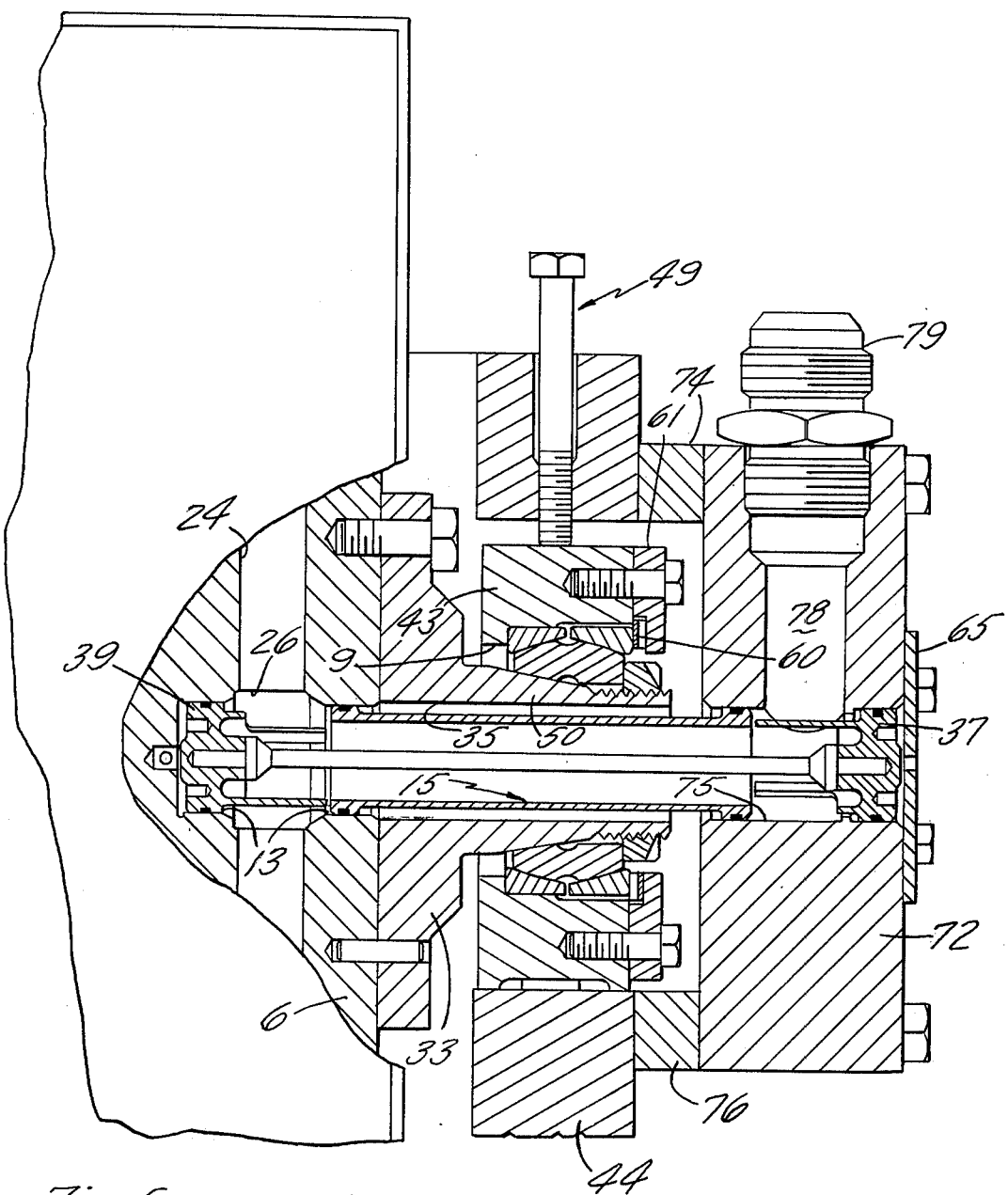
FIG. 4 is an enlarged fragmentary view showing a section through the left trunnion and mounting means.
Figure 5:
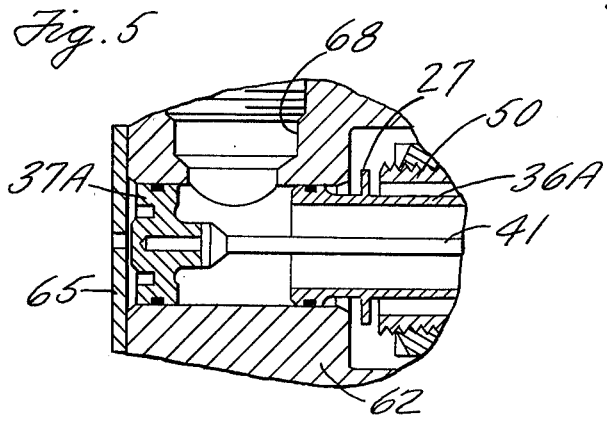
FIG. 5 is an enlarged view of the modification of a portion of the transfer tube.

FIG. 5 is a view of a modified tubular member 36A which has an annular flange 27 thereon positioned between the housing adapter 62 and end of the trunnion shaft 50. It can be seen that this restricts the axial movement of the tubular member 36A. This restriction in FIG. 3 is between the free ends of the tangs 31. In this modification the piston member 37A can be made without the tangs 31 thereby making the construction thereof easier.

The small inwardly projecting flange in each of the cylindrical openings 64 and 75 is to insure that each piston member 37 with its O-ring will not be removed from its respective housing adapter by having it pass over the intersection of the openings 68 or 78. This action will damage the O-rings.

I claim:

1. In combination, a laser mirror, means for mounting said laser mirror, said mirror containing coolant passages, first means for directing a coolant fluid from said mounting means to said coolant passages, second means for directing the coolant flow from said coolant passages to said mounting means, said mirror having a first opening therein and a second opening therein, said first opening being connected to one end of said coolant passages and said second opening being connected to the other end of said coolant passages, said first means for directing a coolant fluid from said mounting means to said coolant passages including a first axially movable transfer tube assembly, said second means for directing the coolant flow from said coolant passages to said mounting means including a second axially movable transfer tube assembly, said first transfer tube assembly having one end positioned in said first opening, said second transfer tube assembly having one end positioned in said second opening, said mounting means having a third opening therein and a fourth opening therein, said third opening facing said first opening on said mirror, said fourth opening facing said second opening on said mirror, said first transfer tube assembly having its other end positioned in said third opening, said second transfer tube assembly having its other end positioned in said fourth opening, means limiting the axial movement of each of said first and second transfer tube assemblies.

2. A combination as set forth in claim 1 including, said mounting means having a cooling inlet, said mounting means having a coolant exit, said coolant inlet being connected to said third opening, said coolant exit being connected to said fourth opening.

3. A combination as set forth in claim 2 including, the end of said first transfer tube assembly in said first opening having a first radial opening for receiving a coolant from said coolant inlet, the end of said first transfer tube assembly in said third opening having a second radial opening for directing a coolant to said coolant passages, the end of said second transfer tube assembly in said second opening having a third radial opening for receiving a coolant from said coolant passages, the end of said second transfer tube assembly in said fourth opening having a fourth radial opening for directing a coolant to said coolant exit.

4. A combination as set forth in claim 1 wherein said means for mounting said laser mirror includes trunnion means whereby the mirror can be moved for pivotal alignment, said trunnion means includes a trunnion on each side of the mirror, one trunnion being aligned with said first opening on one side of said mirror and a second trunnion is aligned with said second opening on the other side of said mirror, each trunnion having an opening therein to permit a floating transfer tube assembly to pass therethrough.

5. A combination as set forth in claim 1, wherein said mounting means includes means on one side of said mirror for translating it to make lateral adjustment, said translating means including a sliding section connected to said mirror, said sliding section having an opening so that the transfer tube assembly on that side can pass therethrough.

6. A combination as set forth in claim 4 wherein said mounting means includes means on one side of said mirror for translating it to make lateral adjustment, said translating means including a sliding section connected to one of said trunnions.

7. A combination as set forth in claim 3 wherein each transfer tube assembly has a tubular member with an external piston surface on each end thereof, piston members being spaced from each end of the tubular member and being connected by a tie rod through said tubular member, said piston members and the ends of the tubular member forming said radial openings.

8. A combination as set forth in claim 7 wherein said piston members and tie rod have a limited axial movement between said mirror and mounting means, and said tubular member having a limited axial movement within said piston members.

* * * * *